United States Patent
DeVore et al.

(10) Patent No.: US 9,909,284 B2
(45) Date of Patent: Mar. 6, 2018

(54) MISSED CUT DETECTION AND REACTION

(71) Applicant: Caterpillar Inc., Peoria, IL (US)

(72) Inventors: James H. DeVore, Metamora, IL (US);
Thandava K. Edara, Peoria, IL (US);
Mo Wei, Dunlap, IL (US); Michael A. Taylor, Swissvale, PA (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 389 days.

(21) Appl. No.: 14/665,720

(22) Filed: Mar. 23, 2015

(65) Prior Publication Data
US 2016/0282857 A1    Sep. 29, 2016

(51) Int. Cl.
| | |
|---|---|
| G05B 19/04 | (2006.01) |
| G05B 19/41 | (2006.01) |
| E02F 9/26 | (2006.01) |
| G05B 19/418 | (2006.01) |
| E21B 43/12 | (2006.01) |
| G05B 19/042 | (2006.01) |

(52) U.S. Cl.
CPC ............ *E02F 9/262* (2013.01); *E21B 43/121* (2013.01); *G05B 19/0426* (2013.01); *G05B 19/41815* (2013.01); *Y02P 90/02* (2015.11)

(58) Field of Classification Search
CPC .................... G05B 19/41815; G05B 19/0426; E02F 9/262
USPC .......................................... 700/109, 110, 114
See application file for complete search history.

(56) References Cited

U.S. PATENT DOCUMENTS

| | | | |
|---|---|---|---|
| 5,485,885 A | 1/1996 | Matsushita et al. | |
| 8,620,535 B2 | 12/2013 | Friend | |
| 8,731,784 B2 | 5/2014 | Hayashi | |
| 2008/0082238 A1* | 4/2008 | Mannepalli | E02F 9/2045 701/50 |
| 2014/0180547 A1 | 6/2014 | Edara et al. | |
| 2016/0077513 A1* | 3/2016 | Wei | G05D 1/0217 700/114 |

* cited by examiner

*Primary Examiner* — Michael J Brown
(74) *Attorney, Agent, or Firm* — James S. Bennin; Miller, Matthias & Hull

(57) ABSTRACT

A computer-implemented method of responding to a missed cut during a pass made along a planned cut profile using an implement is provided. The computer-implemented method may include identifying the missed cut based at least partially on an implement position and a target cut point, predicting a performance value of the pass based at least partially on the missed cut and an implement load, and restarting the pass if the performance value is less than a minimum performance threshold and the implement load is less than a minimum load threshold.

20 Claims, 7 Drawing Sheets

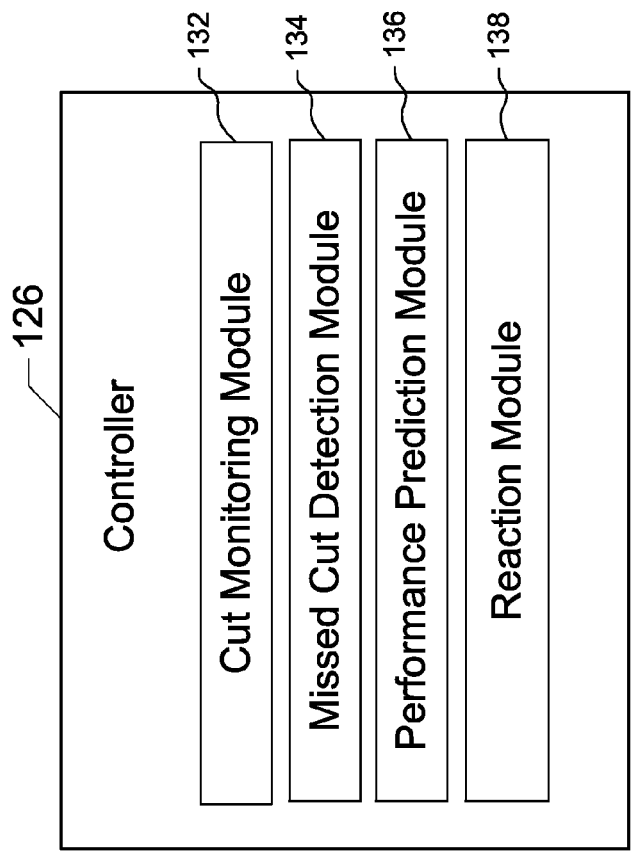
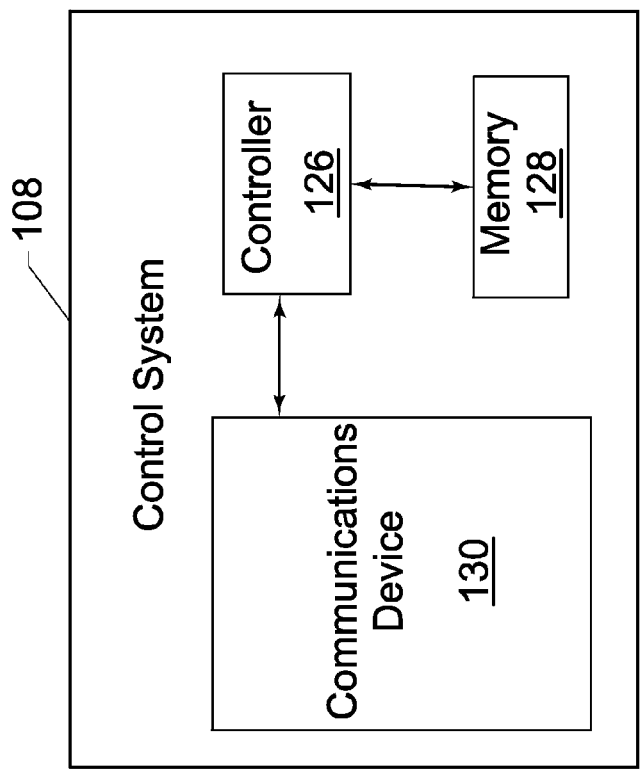
FIG.3
FIG.2

MISSED CUT DETECTION AND REACTION

TECHNICAL FIELD

The present disclosure relates generally to controlling semi-autonomous and autonomous machines, and more particularly, to methods, devices and systems for identifying and determining appropriate reactions to missed cuts.

BACKGROUND

Machines such as, for example, track-type tractors, dozers, motor graders, wheel loaders, and the like, are used to perform a variety of tasks. For example, these machines may be used to move material and/or alter work surfaces at a worksite. In general, the machines may function in accordance with a work plan for a given worksite to perform operations, including digging, loosening, carrying, and any other manipulation of material within a worksite. Furthermore, the work plan may often involve repetitive tasks that may be entirely or at least partially automated to minimize operator involvement. Accordingly, the machines may include not only manned machines, but also autonomous or semi-autonomous vehicles that perform tasks in response to preprogrammed commands or commands delivered remotely and/or locally.

In such work environments, it is desirable to ensure that the machines perform work operations such that the material is moved in an efficient and productive manner. In substantially automated work environments, much of the overall efficiency or productivity relies on the predictability of each machine, or the ability of the machine to accurately execute the task according to the predetermined work plan. In dozing applications, the ability of the machine to accurately initiate a cut at the appropriate target cut location for a given pass can be adversely affected by inconsistencies in the materials involved, irregularities in the work surface, machine limitations, or a variety of other factors. Moreover, seemingly insignificant deviations in the initial cut position may be compounded and pronounced after several passes, which may require more time and effort to correct at the back end.

Realizing the significance of providing more accurate cuts, conventional autonomous dozing systems attempt to prevent such deviations at the forefront. More particularly, several conventional systems employ sensors or other feedback mechanisms installed on the machines to closely monitor the actual progress relative to the planned cut profile and adjust machine and implement controls to minimize deviations. As disclosed in U.S. Pat. No. 8,731,784 ("Hayashi"), for example, a laser guided mechanism is used to provide feedback of a cutting blade edge position relative to the actual surface or terrain and to adjust the blade position accordingly. While such systems may help prevent the potential for initial errors, these systems do not provide adequate means for reacting to missed target cut points if and when they do occur.

Accordingly, there is a need to provide more intuitive and systematic means for reacting to missed cuts in a manner which aids in improving overall efficiency and productivity. The present disclosure is directed at addressing one or more of the deficiencies and disadvantages set forth above. However, it should be appreciated that the solution of any particular problem is not a limitation on the scope of this disclosure or of the attached claims except to the extent express noted.

SUMMARY OF THE DISCLOSURE

In one aspect of the present disclosure, a computer-implemented method of responding to a missed cut during a pass made along a planned cut profile using an implement is provided. The method may include identifying the missed cut based at least partially on an implement position and a target cut point, predicting a performance value of the pass based at least partially on the missed cut and an implement load, and restarting the pass if the performance value is less than a minimum performance threshold and the implement load is less than a minimum load threshold.

In another aspect of the present disclosure, a control system for responding to a missed cut during a pass made along a planned cut profile using an implement is provided. The control system may include a memory configured to retrievably store one or more algorithms, and a controller in communication with the memory. Based on the one or more algorithms, the controller may be configured to at least identify the missed cut based at least partially on an implement position and a target cut point, predict a performance value of the pass based at least partially on the missed cut and an implement load, and restart the pass if the performance value is less than a minimum performance threshold and the implement load is less than a minimum load threshold.

In yet another aspect of the present disclosure, a controller for responding to a missed cut during a pass made along a planned cut profile using an implement is provided. The controller may include a missed cut detection module configured to identify the missed cut based at least partially on an implement position and a target cut point, a performance prediction module configured to calculate a performance value of the pass based at least partially on the missed cut and an implement load, and a reaction module configured to restart the pass if the performance value is less than a minimum performance threshold and the implement load is less than a minimum load threshold.

BRIEF DESCRIPTION OF THE DRAWINGS

FIG. 2 is a diagrammatic illustration of one exemplary control system of the present disclosure;

FIG. 3 is a diagrammatic illustration of one exemplary controller of the present disclosure;

DETAILED DESCRIPTION

Figure 1:
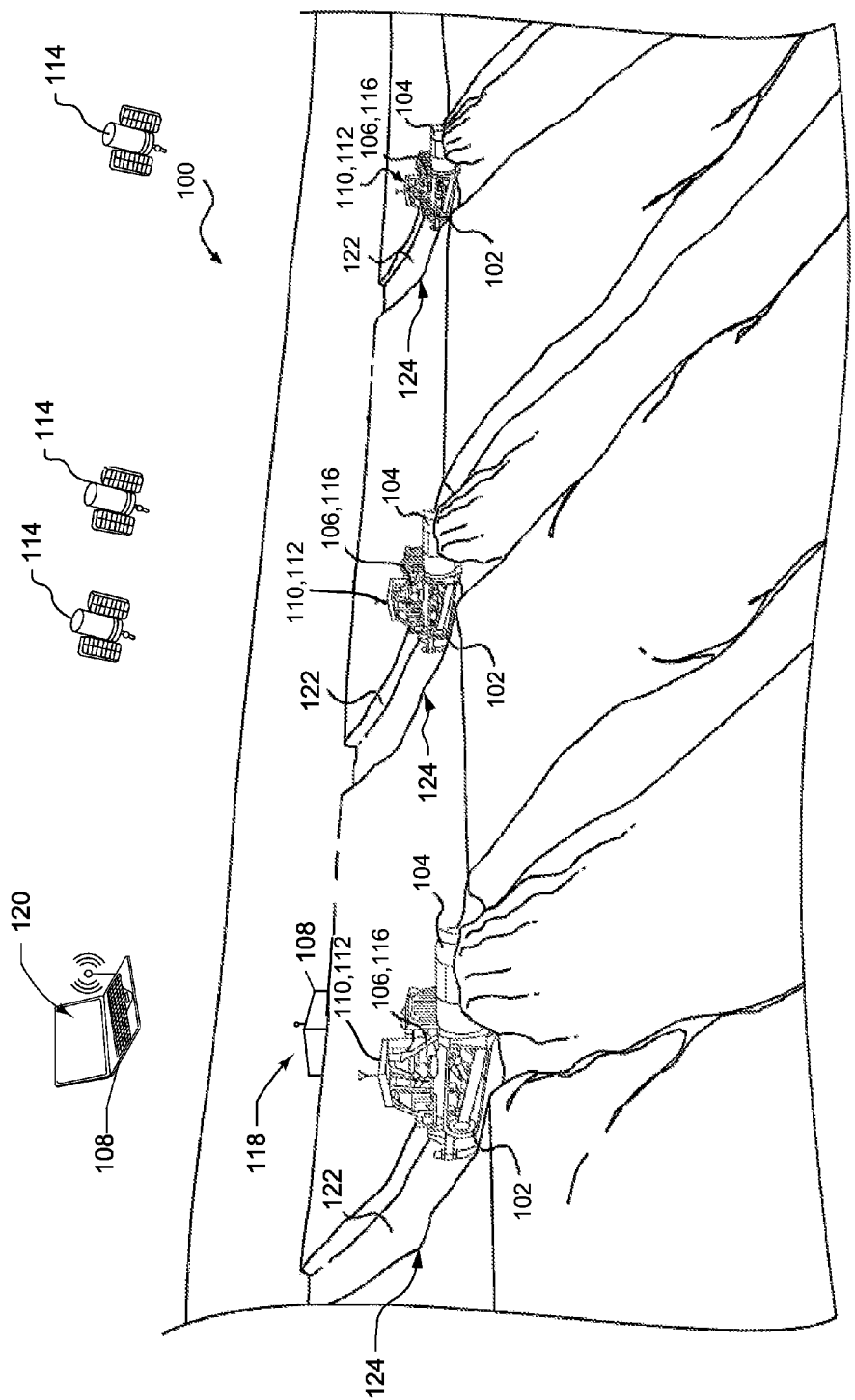
FIG. 1 is a pictorial illustration of one exemplary worksite within which the present disclosure may be implemented.

Referring now to FIG. 1, one exemplary worksite 100 is illustrated with one or more machines 102 performing predetermined tasks. The worksite 100 may include, for example, a mine site, a landfill, a quarry, a construction site, or any other type of worksite. The predetermined task may be associated with altering the geography at the worksite 100, such as a dozing operation, a grading operation, a leveling operation, a bulk material removal operation, or any other type of operation that results in geographical modifications within the worksite 100. The machines 102 may be mobile machines configured to perform operations associated with industries related to mining, construction, farming, or any other industry known in the art. The machines 102 depicted in FIG. 1, for example, may embody earth moving machines, such as dozers having blades or other work tools or implements 104 movable by way of one or more actuators 106. The machines 102 may also include manned machines or any type of autonomous or semi-autonomous machines.

The overall operations of the machines 102 and the machine implements 104 within the worksite 100 may be managed by a control system 108 that is at least partially in communication with the machines 102. Moreover, each of the machines 102 may include any one or more of a variety of feedback devices 110 capable of signaling, tracking, monitoring, or otherwise communicating relevant machine information to the control system 108. For example, each machine 102 may include a locating device 112 configured to communicate with one or more satellites 114, which in turn, may communicate to the control system 108 various information pertaining to the position and/or orientation of the machines 102 relative to the worksite 100. Each machine 102 may additionally include one or more implement sensors 116 configured to track and communicate position and/or orientation information of the implements 104 to the control system 108. Furthermore, implement load, such as the relative weight of any material that is loaded into or carried by, for instance, the blade of a dozing machine, may be inferred from engine load, track slip, and the like.

The control system 108 may be implemented in any number of different arrangements. For example, the control system 108 may be at least partially implemented at a command center 118 situated locally and/or remotely relative to the worksite 100 with sufficient means for communicating with the machines 102, for example, via satellites 114, or the like. Additionally or alternatively, the control system 108 may be implemented using one or more computing devices 120 with means for communicating with one or more of the machines 102 or one or more command centers 118 that may be locally and/or remotely situated relative to the worksite 100. In still further alternatives, the control system 108 may be implemented on-board any one or more of the machines 102 that are also provided within the worksite 100. Other suitable modes of implementing the control system 108 are possible and will be understood by those of ordinary skill in the art.

Using any of the foregoing arrangements, the control system 108 may generally be configured to monitor the positions of the machines 102 and/or implements 104 relative to the worksite 100 and a predetermined target operation, and provide instructions for controlling the machines 102 and/or implements 104 in an efficient manner in executing the target operation. In certain embodiments, the machines 102 may be configured to excavate areas of a worksite 100 according to one or more predefined excavation plans. The excavation plans can include, among other things, determining the location, size, and shape of a plurality of cuts into an intended work surface 122 at the worksite 100 along one or more slots 124. In such embodiments, the control system 108 may be used to plan not only the overall excavation, but also to define an implement path within the slots 124 or any other areas of the work surface 122. For a given work surface 122 and pass, for instance, the control system 108 may define a blade path, composed of a loading profile and a carry profile, best suited to guide the machines 102 in an efficient, productive and predictable manner. Although described in connection with planned cut profiles and passes along a work surface 122, the control system 108 may similarly be employed in conjunction with other types of tasks.

Turning to FIG. 2, one exemplary embodiment of a control system 108 that may be used in conjunction with the worksite 100 and the machines 102 of FIG. 1 is diagrammatically provided. As shown, the control system 108 may generally include a controller 126, a memory 128, and a communications device 130, among other things. More specifically, the controller 126 may be configured to operate according to one or more algorithms that are retrievably stored within the memory 128. The memory 128 may be provided on-board relative to the controller 126, external to the controller 126, or otherwise in communication therewith. The communications device 130 may be configured to enable the controller 126 to communicate with one or more of the machines 102, and receive information pertaining to the position and/or orientation of the machines 102 and the machine implements 104, for example, via satellites 114, or any other suitable means of communication. Moreover, the controller 126 may be implemented using any one or more of a processor, a microprocessor, a microcontroller, or any other suitable means for executing instructions stored within the memory 128. Additionally, the memory 128 may include non-transitory computer-readable medium or memory, such as a disc drive, flash drive, optical memory, read-only memory (ROM), or the like.

Figure 4:
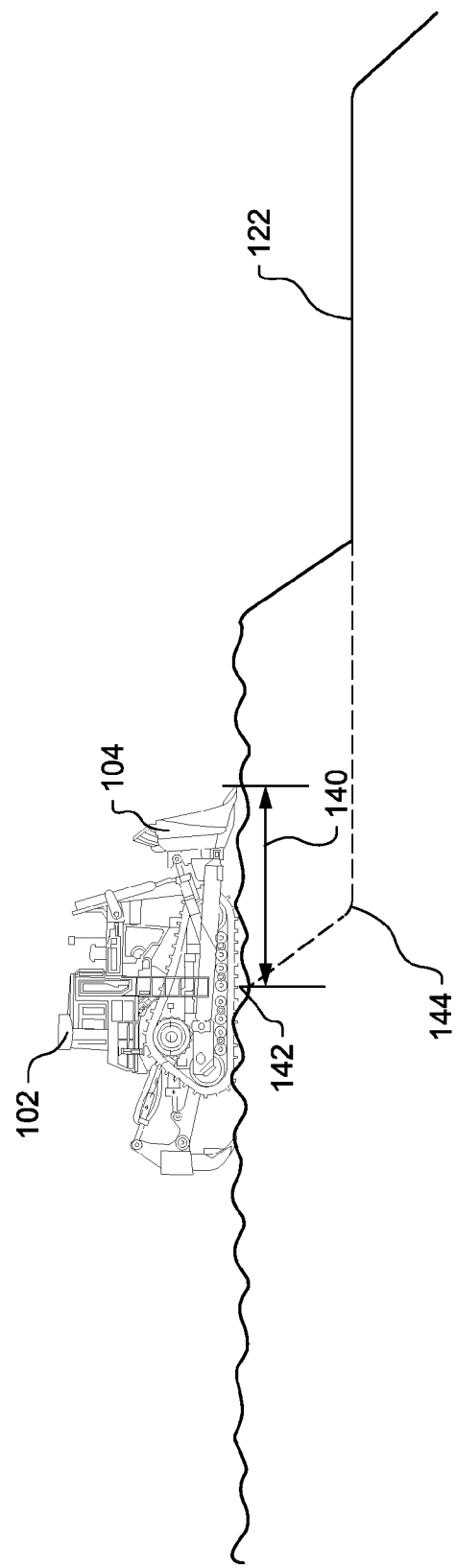
FIG. 4 is a diagrammatic illustration of one exemplary pass being made according to a target cut point and a planned cut profile.

As further shown in FIG. 3, the controller 126 may be configured to identify a missed cut while performing a pass along a planned cut profile, and react to any identified missed cuts. Specifically, the controller 126 may be configured to function according to one or more preprogrammed algorithms, which may be generally categorized into, for example, a cut monitoring module 132, a missed cut detection module 134, a performance prediction module 136, and a reaction module 138. As shown in FIG. 4, the cut monitoring module 132 may configure the controller 126 to monitor a deviation distance 140, or the distance between the tracked position of the implement 104 and a predefined target cut point 142. The deviation distance 140 may be monitored once the implement 104 reaches or passes the target cut point 142, while the implement 104 engages the work surface 122, and/or while the machine 102 follows the planned cut profile 144 after the initial cut is made. The deviation distance 140 may also be measured in a three-dimensional frame of reference such that missed cuts can be identified in any number of different scenarios which may unexpectedly occur.

Figure 5:
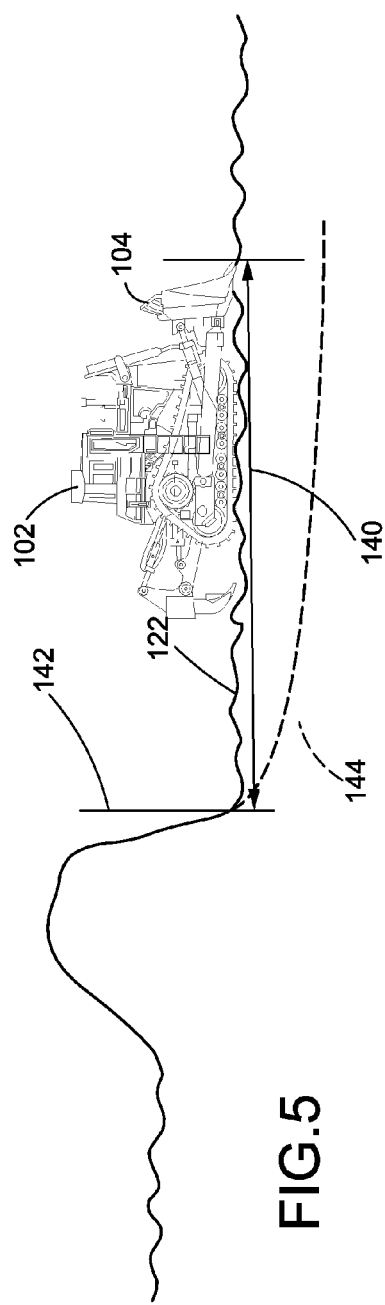
FIG. 5 is a diagrammatic illustration of one possible scenario which may result in a missed cut.
Figure 6:
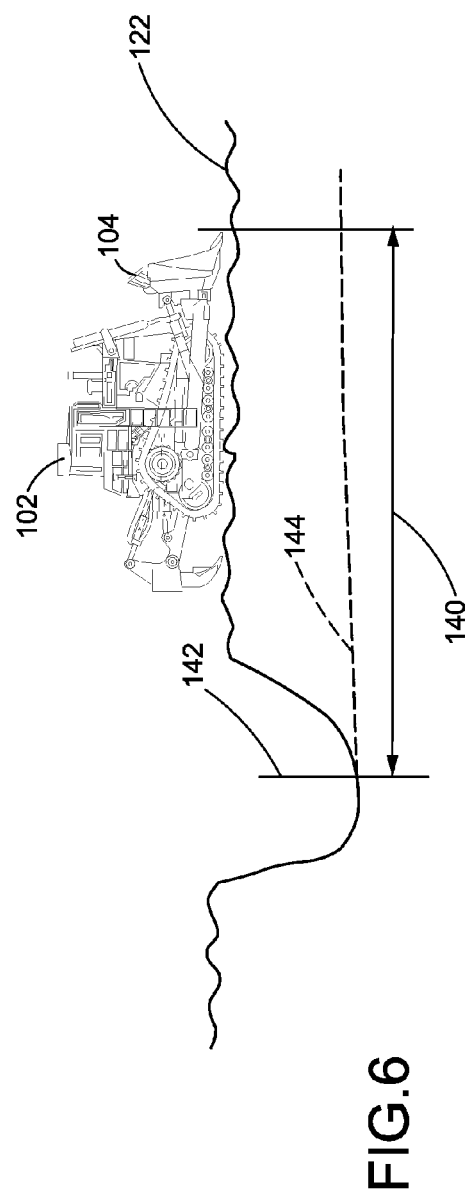
FIG. 6 is a diagrammatic illustration of another possible scenario which may result in a missed cut.
Figure 7:
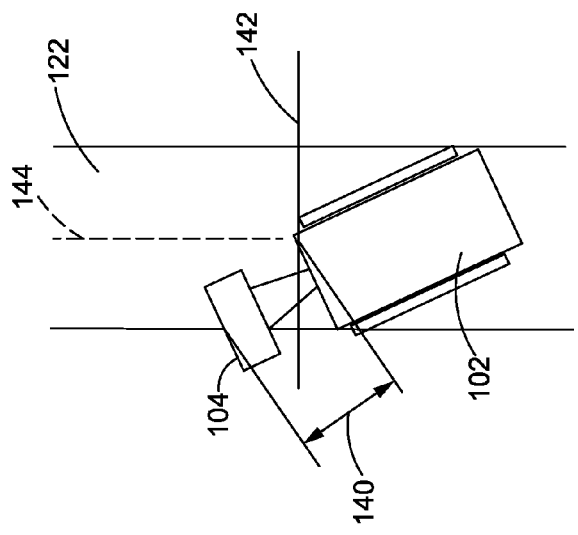
FIG. 7 is a diagrammatic illustration of another possible scenario which may result in a missed cut.
Figure 8:
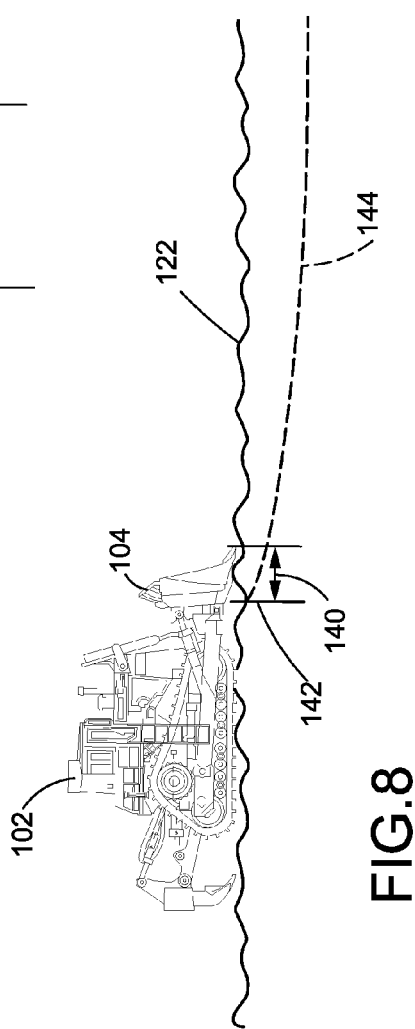
FIG. 8 is a diagrammatic illustration of yet another possible scenario which may result in a missed cut.

Referring to FIGS. 5-8, for example, common scenarios often resulting in missed cuts are illustrated. For instance, steep inclines associated with hard or raised sections in the work surface 122 immediately preceding the target cut point 142 as shown in FIG. 5 may cause the machine 102 to miss the target cut point 142. Similarly, target cut points 142 which lie within a steep hole of a work surface 122 as shown in FIG. 6 also often result in missed cuts. Missed cuts may also occur in situations where there is not enough time or space to correctly align and position the machine 102 and/or the implement 104 sufficiently before reaching the target cut point 142. As shown in FIG. 7, for instance, missed cuts may result from unplanned steering corrections that are applied to the machine 102 immediately prior to a target cut point 142. Missed cuts may also result in situations where the travel speed of the machine 102 does not allow sufficient time for the implement 104 to lower and align with the appropriate target cut point 142 as shown for example in FIG. 8.

The missed cut detection module 134 of FIG. 3 may configure the controller 126 to identify a missed cut based at least partially on the position of the implement 104 and the target cut point 142. More specifically, once the implement 104 initiates a cut, the missed cut detection module 134 may determine if the deviation distance 140, or the distance between the actual cut point and the target cut point 142, exceeds a predefined distance threshold. If the deviation distance 140 is within acceptable range, the missed cut detection module 134 may deem the cut as acceptable and proceed according to the originally planned cut profile 144. If, however, the deviation distance 140 exceeds the maximum acceptable distance, the missed cut detection module 134 may preliminarily flag the event as a missed cut, but initiate further analysis to determine whether the identified missed cut will adversely affect the given pass in terms of efficiency and productivity. For instance, some missed cuts do not necessarily result in poor efficiency, and the controller 126 may perform further analysis to distinguish between those missed cuts that are benign and those that are adverse.

Referring still to FIG. 3, the performance prediction module 136 may configure the controller 126 to predict a performance value corresponding to the current pass, or the projected efficiency of the current pass should the machine 102 be allowed to proceed according to the planned cut profile without correction. For example, the performance prediction module 136 may configure the controller 126 to calculate the performance value as a ratio between the projected load of the implement 104 and the load capacity of the implement 104. The projected implement load may be calculated as the sum of the inferred current implement load, and the load remaining in the given pass, as derived from the planned cut profile 144. The implement load capacity may be based on specifications of the machine 102 and the implement 104, and/or predefined based on user preferences. It will be understood that the performance value may alternatively be defined or derived using any other suitable calculation as will be apparent to those of ordinary skill in the art.

Once the performance value has been determined, the reaction module 138 of FIG. 3 may configure the controller 126 to determine whether the performance value indicates a need to abort, restart or otherwise modify the current pass. Specifically, the reaction module 138 may compare the performance value to a predefined performance threshold, or the minimum performance rating needed to qualify the current pass as an efficient and productive pass. If the performance value meets the minimum threshold, the reaction module 138 may configure the controller 126 to deem the missed cut as insignificant, and continue the pass according to the planned cut profile 144 without adjustments. If, however, the performance value does not meet the minimum threshold, the controller 126 may be configured to deem the missed cut as potentially adverse, and react accordingly. Furthermore, based on other parameters of the machine 102 and/or implement 104, for example, the controller 126 may react by restarting the pass according to the original cut profile 144, restarting the pass according to a recalculated cut profile 144, proceeding according to the original cut profile 144, proceeding according to a recalculated cut profile 144, or by taking other corrective actions.

In particular, if the performance value suggests less than optimal efficiency, the reaction module 138 may configure the controller 126 to determine the amount of load in the implement 104, for example, as inferred from engine load, track slip, and the like. Based the amount of load in the implement 104, and based on one or more predefined load thresholds, the reaction module 138 may configure the controller 126 to react in a manner which optimizes productivity despite the missed cut. In some situations, for instance, the implement 104 may be sufficiently loaded relative to its location along the pass even after missing the target cut point 142. In those cases, the machine 102 may be better left to continue along the pass, with or without adjustments to the implement 104, and still provide acceptable results. In other situations, the implement 104 may be insufficiently loaded relative to its location along the pass, which may be due to the missed cut. In such cases, it may be more productive to abort and to restart the pass, for example, by stopping the machine 102, sending the machine 102 back to the target cut point 142, and re-engaging the first cut according to the original cut profile 144 with or without adjustments.

More particularly, if the implement load is zero or otherwise indicating that the implement 104 is substantially empty, the controller 126 may be configured to restart the pass according to the original or planned cut profile 144 without adjustments. If the implement load is not empty but relatively low, or less than or equal to a relatively low load threshold, the controller 126 may be configured to restart the pass according to a modified cut profile 144 that is recalculated to include the current implement load. If the implement load is greater than the low load threshold but less than or equal to a medium load threshold, the controller 126 may be configured to spread the load and restart the pass according to a modified cut profile 144 that is recalculated to exclude the discarded implement load. If the implement load is greater than the medium load threshold but less than or equal to a relatively high load threshold, the controller 126 may be configured to adjust the implement 104 to increase the cut depth and proceed with the pass according to the planned cut profile 144. Furthermore, if the implement load is greater than the relatively high load threshold, the controller 126 may be configured to proceed according to the planned cut profile 144 without adjustments.

Other variations and modifications to the algorithms or methods will be apparent to those of ordinary skill in the art. Exemplary algorithms or methods by which the controller 126 may be operated to identify missed cuts and determine appropriate reactions to missed cuts is discussed in more detail below.

INDUSTRIAL APPLICABILITY

In general, the present disclosure sets forth methods, devices and systems for engaging implements or blades along target cut profiles, where there are motivations to promote predictability and improve overall efficiency and productivity. Although applicable to any type of machine, the present disclosure may be particularly applicable to autonomously or semi-autonomously controlled dozing machines where the dozing machines are controlled along particular travel routes within a worksite to excavate materials. Moreover, the present disclosure promotes predictability by recognizing different possible scenarios which may result from a missed cut, and providing automated responses for each scenario designed to maximize productivity. Additionally, by enabling optimum implement loads per pass even after missing a target cut point, the present disclosure improves consistency between passes and further promotes the predictability and efficiency of successive passes.

Figure 9:
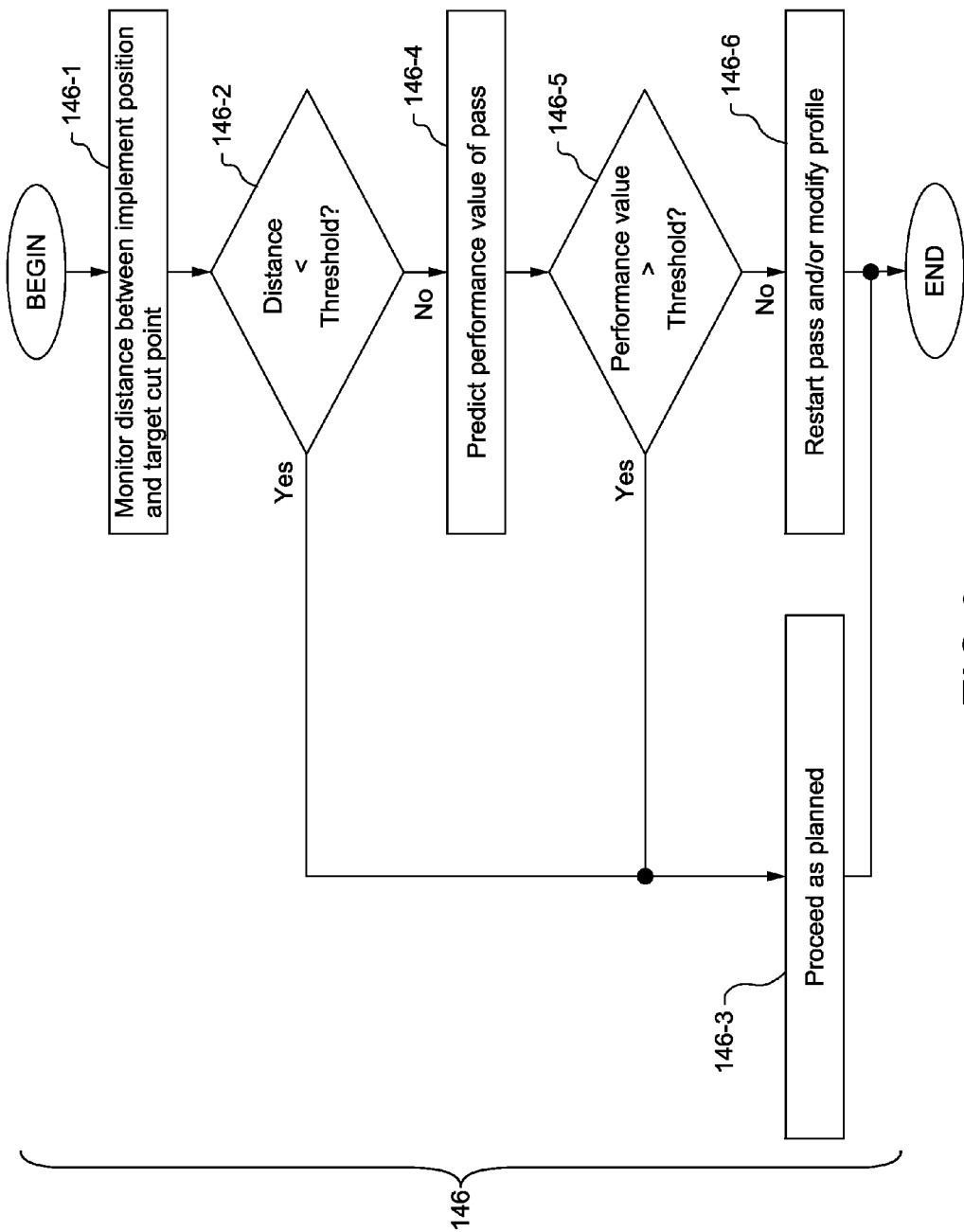
FIG. 9 is a flowchart illustrating one exemplary method for identifying and reacting to missed cuts.

Turning to FIG. 9, one exemplary algorithm or computer-implemented method 146 for identifying and reacting to a missed cut is diagrammatically provided, according to which the control system 108 and the controller 126 may be configured to operate. As shown in block 146-1 of FIG. 9, and as described with respect to the cut monitoring module 132 of FIG. 3, the controller 126 may monitor a deviation distance 140 between the position of the implement 104 and the target cut point 142. In block 146-2, and as discussed with respect to the missed cut detection module 134 of FIG. 3, the controller 126 may compare the deviation distance 140 to a predefined distance threshold while executing a pass to determine if the target cut point 142 has been missed. If the implement 104 initiates a cut that is within an acceptable distance from the target cut point 142, the controller 126 may continue the pass along the planned cut profile 144 without any adjustments as in block 146-3. If, however, the implement position or deviation distance 140 indicates a cut being made at a sufficient distance away from the target cut point 142, the controller 126 may continue to block 146-4 to predict a performance value of the current pass.

More specifically, in block 146-4, as described with respect to the performance prediction module 136 of FIG. 3, the controller 126 may predict the performance value as a calculated ratio or any other rating or index comparing the projected implement load to the load capacity of the implement 104. In block 146-5, the controller 126 may additionally compare the performance value to a predefined threshold to determine if efficiency is better served by continuing the pass or by restarting and/or modifying the pass. For instance, if the performance value meets a minimum performance threshold, the controller 126 may continue the pass along the planned cut profile 144 without any adjustments as in block 146-3. If, however, the performance value does not meet the minimum performance threshold, the controller 126 may proceed to block 146-6 to determine the appropriate response. In particular, the controller 126 in block 146-6, as described with respect to the reaction module 138 of FIG. 3, may respond to the missed cut by restarting the pass according to the planned cut profile 144, restarting the pass according to a recalculated cut profile 144, proceeding according to the planned cut profile 144, proceeding according to a recalculated cut profile 144, or by taking other corrective actions.

Figure 10:
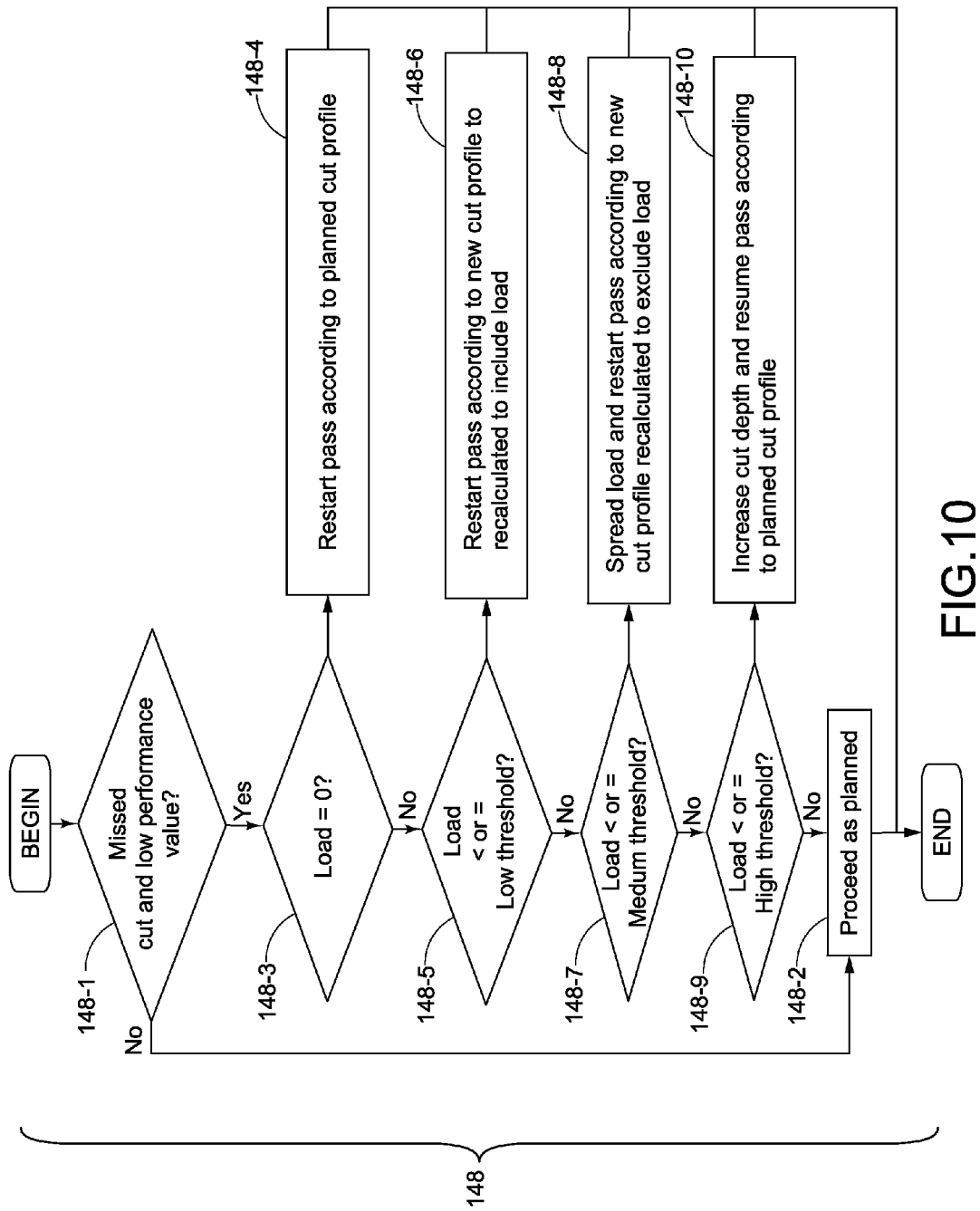
FIG. 10 is a flowchart illustrating one exemplary method for reacting to missed cuts based on implement load.

Referring now to FIG. 10, one exemplary sub-algorithm, algorithm or computer-implemented method 148 for reacting to a missed cut is provided. As shown in block 148-1, the controller 126 may further proceed to determine the appropriate response, so long as a missed cut has been identified and so long as the performance value remains less than minimum performance thresholds. For example, if there is no missed cut or if the performance value satisfies the minimum performance threshold, the controller 126 may continue the pass along the planned cut profile 144 without any adjustments as shown in block 148-2. To further determine the appropriate reaction to the missed cut, the controller 126 may initially observe the amount of load that is currently held by the implement 104, as inferred from one or more machine parameters, such as engine load, track slip, and the like. Moreover, based on the implement load and a plurality of load thresholds, the controller 126 may be able to select the response most likely to optimize productivity and efficiency despite the missed cut.

For example, if the implement load is zero or otherwise indicating a substantially empty implement 104 as determined in block 148-3, the controller 126 may restart the pass according to the planned cut profile 144 without adjustments in block 148-4. If the implement load is greater than zero but less than or equal to a relatively low load threshold as determined in block 148-5, the controller 126 may restart the pass according to a modified cut profile 144 that is recalculated to include the current load in block 148-6. If the implement load is greater than the low load threshold but less than or equal to a medium load threshold as determined in block 148-7, the controller 126 may spread the load and restart the pass according to a modified cut profile 144 that is recalculated to exclude the discarded implement load in block 148-8. If the implement load is greater than the medium load threshold but less than or equal to a relatively high load threshold as determined in block 148-9, the controller 126 may adjust the implement 104 to increase the cut depth and proceed with the pass according to the planned cut profile 144 in block 148-10. Lastly, if the implement load is greater than the relatively high load threshold as determined in block 148-9, the controller 126 may proceed according to the planned cut profile without adjustments as in block 148-2.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A computer-implemented method of responding to a missed cut during a pass made along a planned cut profile using an implement, the computer-implemented method comprising:
   identifying, by a controller, the missed cut based at least partially on an implement position and a target cut point;
   predicting, by the controller, a performance value of the pass based at least partially on the missed cut and an implement load; and
   restarting, by the controller, the pass if the performance value is less than a minimum performance threshold and the implement load is less than a minimum load threshold.

2. The computer-implemented method of claim 1, wherein a deviation distance between the implement position and the target cut point is monitored relative to a predefined distance threshold to identify the missed cut.

3. The computer-implemented method of claim 1, wherein the performance value is calculated as a ratio between a projected implement load and a load capacity of the implement.

4. The computer-implemented method of claim 1, wherein the pass proceeds as planned without changes if the performance value satisfies the minimum performance threshold.

5. The computer-implemented method of claim 1, further comprising:
   restarting the pass according to the planned cut profile if the implement load is zero;
   restarting the pass according to a modified cut profile recalculated to include the implement load if the implement load is less than a first minimum load threshold but greater than zero;
   restarting the pass according to a modified cut profile recalculated to exclude the implement load if the implement load is less than a second minimum load threshold but greater than the first minimum load threshold;

proceeding according to the planned cut profile modified to increase cut depth if the implement load is less than a third minimum load threshold but greater than the second minimum load threshold; and proceeding according to the planned cut profile if the implement load is greater than the third minimum load threshold.

6. The computer-implemented method of claim 5, wherein a load of the implement is spread before restarting the pass if the implement load is less than the second minimum load threshold but greater than the first minimum load threshold.

7. The computer-implemented method of claim 5, wherein the cut depth is increased according to a remaining load capacity of the implement if the implement load is less than the third minimum load threshold but greater than the second minimum load threshold.

8. A control system for responding to a missed cut during a pass made along a planned cut profile using an implement, the control system comprising:
  a memory configured to retrievably store one or more algorithms; and
  a controller in communication with the memory,
    the controller, based on the one or more algorithms, configured to:
      identify the missed cut based at least partially on an implement position and a target cut point,
      predict a performance value of the pass based at least partially on the missed cut and an implement load, and
      restart the pass if the performance value is less than a minimum performance threshold and the implement load is less than a minimum load threshold.

9. The control system of claim 8, wherein the controller is configured to monitor a deviation distance between the implement position and the target cut point relative to a predefined distance threshold in identifying the missed cut.

10. The control system of claim 8, wherein the controller is configured to calculate the performance value as a ratio between a projected implement load and a load capacity of the implement.

11. The control system of claim 8, wherein the controller is configured to proceed without changes if the performance value satisfies the minimum performance threshold.

12. The control system of claim 8, wherein the controller is further configured to:
  restart the pass according to the planned cut profile if the implement load is zero,
  restart the pass according to a modified cut profile recalculated to include the implement load if the implement load is less than a first minimum load threshold but greater than zero,
  restart the pass according to a modified cut profile recalculated to exclude the implement load if the implement load is less than a second minimum load threshold but greater than the first minimum load threshold,
  proceed according to the planned cut profile modified to increase cut depth if the implement load is less than a third minimum load threshold but greater than the second minimum load threshold, and
  proceed according to the planned cut profile if the implement load is greater than the third minimum load threshold.

13. The control system of claim 12, wherein the controller is configured to spread a load of the implement before restarting the pass if the implement load is less than the second minimum load threshold but greater than the first minimum load threshold.

14. The control system of claim 12, wherein the controller is configured to increase the cut depth according to a remaining load capacity of the implement if the implement load is less than the third minimum load threshold but greater than the second minimum load threshold.

15. A controller for responding to a missed cut during a pass made along a planned cut profile using an implement, the controller comprising:
  a missed cut detection module configured to identify the missed cut based at least partially on an implement position and a target cut point;
  a performance prediction module configured to calculate a performance value of the pass based at least partially on the missed cut and an implement load; and
  a reaction module configured to restart the pass if the performance value is less than a minimum performance threshold and the implement load is less than a minimum load threshold.

16. The controller of claim 15, further comprising a cut monitoring module configured to monitor a deviation distance between the implement position and the target cut point relative to a predefined distance threshold,
  the missed cut detection module being configured to identify the missed cut if the deviation distance exceeds the predefined distance threshold.

17. The controller of claim 15, wherein the performance prediction module is configured to calculate the performance value as a ratio between a projected implement load and a load capacity of the implement.

18. The controller of claim 15, wherein the reaction module is further configured to:
  restart the pass according to the planned cut profile if the implement load is zero,
  restart the pass according to a modified cut profile recalculated to include the implement load if the implement load is less than a first minimum load threshold but greater than zero,
  restart the pass according to a modified cut profile recalculated to exclude the implement load if the implement load is less than a second minimum load threshold but greater than the first minimum load threshold,
  proceed according to the planned cut profile modified to increase cut depth if the implement load is less than a third minimum load threshold but greater than the second minimum load threshold, and
  proceed according to the planned cut profile if the implement load is greater than the third minimum load threshold.

19. The controller of claim 18, wherein the reaction module is configured to spread a load of the implement before restarting the pass if the implement load is less than the second minimum load threshold but greater than the first minimum load threshold.

20. The controller of claim 18, wherein the reaction module is configured to increase the cut depth according to a remaining load capacity of the implement if the implement load is less than the third minimum load threshold but greater than the second minimum load threshold.

* * * * *